(12) United States Patent
Yasumoto

(10) Patent No.: US 8,313,674 B2
(45) Date of Patent: Nov. 20, 2012

(54) FLAME-RETARDANT POLYOLEFIN RESIN COMPOSITION

(75) Inventor: Kazuhisa Yasumoto, Tokyo (JP)

(73) Assignee: Sun Allomer Ltd., Tokyo (JP)

( * ) Notice: Subject to any disclaimer, the term of this patent is extended or adjusted under 35 U.S.C. 154(b) by 416 days.

(21) Appl. No.: 11/660,000

(22) PCT Filed: Aug. 8, 2005

(86) PCT No.: PCT/JP2005/014520
§ 371 (c)(1),
(2), (4) Date: Jun. 27, 2007

(87) PCT Pub. No.: WO2006/016557
PCT Pub. Date: Feb. 16, 2006

(65) Prior Publication Data
US 2008/0029743 A1    Feb. 7, 2008

(30) Foreign Application Priority Data

Aug. 11, 2004 (JP) .................................. 2004-234210

(51) Int. Cl.
*C09K 21/00* (2006.01)
(52) U.S. Cl. ......... 252/601; 252/609; 524/433; 524/515
(58) Field of Classification Search .................. 252/601, 252/609; 524/433, 515; 428/523
See application file for complete search history.

(56) References Cited

U.S. PATENT DOCUMENTS

| | | | |
|---|---|---|---|
| 4,433,254 A | 2/1984 | Katakura et al. | |
| 4,786,562 A * | 11/1988 | Kakugo et al. | 428/516 |
| 5,708,085 A * | 1/1998 | Hauenstein et al. | 525/106 |
| 6,109,797 A | 8/2000 | Nagura et al. | |
| 6,521,734 B1 | 2/2003 | Araki et al. | |
| 6,756,440 B2 * | 6/2004 | Hase et al. | 524/515 |
| 6,809,140 B2 * | 10/2004 | Hase et al. | 524/433 |
| 7,201,970 B2 * | 4/2007 | Kanamori et al. | 428/523 |

FOREIGN PATENT DOCUMENTS

| | | |
|---|---|---|
| EP | 1 215 237 A2 | 6/2002 |
| EP | 1 319 686 A2 | 6/2003 |
| JP | 62167339 | 7/1987 |
| JP | 03-263440 | 11/1991 |
| JP | 5761012 | 4/1992 |
| JP | 05239281 | 9/1993 |
| JP | 10-310667 | 11/1998 |
| JP | 11-286557 | 10/1999 |
| JP | 2001-316940 | 11/2001 |
| JP | 2002179857 | 6/2002 |
| JP | 2004189792 | 7/2004 |
| JP | 2006052287 | 2/2006 |
| WO | WO99/16796 | 4/1999 |
| WO | WO 03/008466 | 1/2003 |
| WO | WO 03/022920 A1 | 3/2003 |
| WO | WO03/092018 | * 11/2003 |

OTHER PUBLICATIONS

Machine translation of Patent JP 2004-189792, Hase et al.*
Supplemental European Search Report for Application No. EP 05 76 8528 mailed January, mailed Feb. 3, 2009.
"The State Intellectual Property Office of the People's Republic of China"; Search Report; Mar. 25, 2010; 9 pp; Notification of 2$^{nd}$ Office Action; Beijing 100088, China.
JPO Office Action for Japanese Application No. 2004-234210 mailed Nov. 2, 2010 with English translation.

* cited by examiner

*Primary Examiner* — Mark Kopec
*Assistant Examiner* — Haidung Nguyen
(74) *Attorney, Agent, or Firm* — RatnerPrestia

(57) ABSTRACT

A flame-retardant polyolefin resin composition was provided excellent in flame retardance, abrasion resistance, flexibility, low-temperature characteristics, mechanical characteristics such as tensile strength and elongation at break, and heat resistance. The flame-retardant polyolefin resin composition of the present invention comprising 100 parts by weight of a polyolefin (A) and 50 to 400 parts by weight of an inorganic flame retarding agent (B), wherein the polyolefin resin composition (A) comprises 30 to 94% by weight of a polypropylene resin (A-1), 1 to 30% by weight of a low-density polyethylene (A-2) in which the number of terminal vinyl groups per 1000 carbon atoms is 0.2 or more, and 5 to 40% by weight of a modified styrene thermoplastic elastomer (A-3) that possesses 0.4% by weight or more of a carboxylic acid group or an acid anhydride group.

4 Claims, 1 Drawing Sheet

FLAME-RETARDANT POLYOLEFIN RESIN COMPOSITION

This application is a U.S. National Stage filing of PCT Application No. PCT/JP2005/014520, filed Aug. 8, 2005, which claims priority of Japanese Application No. 2004-234210, filed Aug. 11, 2004.

TECHNICAL FIELD

The present invention relates to a polyolefin resin composition provided with flame retardancy.

BACKGROUND ART

Polyolefin resins are generally cheap, and because of their excellent mechanical strength, heat resistance, chemical durability, mold processability, and recyclability, they are utilized in a wide range of fields, such as various industrial materials, auto parts, consumer electronic appliances, and packaging materials. Since polyolefin resins are flammable, various methods have been conventionally proposed for converting polyolefin resins into flame retardant resins, and in recent years, because of the increasing awareness of environmental problems, various methods have been elaborated to convert polyolefin resins into flame retardant resins so as not to generate harmful gases such as halogen gases at the time of combustion. For example, flame-retardant olefin resin compositions have been proposed, in which a metal hydrate, that is a halogen free flame retardant, is mixed into a polyolefin resin, such as polypropylene or a polyethylene resins, or a thermoplastic elastomer. However, in order to obtain flame retardancy that is equivalent to the conventional halogen containing flame retarding materials, there was a necessity to mix a large amount of the metal hydrate. Incorporation of large amount of metal hydrate makes the thus obtained flame-retardant polyolefin resins becomes inferior in mechanical properties such as flexibility, abrasion resistance, low-temperature characteristics, tensile strength, and elongation at break. Therefore, polyolefin resin compositions provided with both sufficient flame retardancy and the aforementioned mechanical properties are demanded.

Accordingly, in order to solve the aforementioned problems, for example, Patent Document 1 has proposed a flame-retardant olefin resin composition comprising a low-crystallinity and flexible α-olefin homopolymer or copolymer and magnesium hydroxide. This flame-retardant olefin resin composition is provided with high flame retardancy by filling with a high concentration of magnesium hydroxide and it has been admitted that the above resin composition is flexible and has excellent low-temperature characteristics and processability.

Patent Document 2 has proposed an abrasion resistant and flame-retardant resin composition comprising an α-olefin (co-) polymer, an ethylene (co-) polymer, a rubber, an inorganic flame retardant, and a polymer including a carboxylic acid group, and the like.

Patent Document 3 has proposed a flame-retardant resin composition containing a propylene resin, a modified styrene thermoplastic elastomer, and a metal hydrate.

[Patent Document 1] Japanese Unexamined Patent Application, First Publication No. Sho 62-167339

[Patent Document 2] Japanese Unexamined Patent Application, First Publication No. Hei 5-239281

[Patent Document 3] Japanese Unexamined Patent Application, First Publication No. 2002-179857

DISCLOSURE OF INVENTION

Problems to be Solved by the Invention

However, with regard to the resin composition proposed in Patent Document 1, the abrasion resistance and the heat resistance were not sufficient, so that a problem arises that the resin composition cannot be practically available. Furthermore, since the flame-retardant composition disclosed in Patent Document 2 uses an ethylene (co-) polymer or a rubber as an essential component, although it had excellent flame retardancy and flexibility, the heat resistance and the abrasion resistance were insufficient. Furthermore, with regard to the resin composition disclosed in Patent Document 3, the abrasion resistance was insufficient, so that further improvements were required.

The present invention has been carried out taking such circumstances into consideration, and has an object in providing a flame-retardant polyolefin resin composition with excellent mechanical characteristics, such as abrasion resistance, flexibility, low-temperature characteristics (low-temperature flexibility), tensile strength, and elongation at break, and heat resistance, even if a large amount of inorganic flame retardants is incorporated in the polyolefin resin for obtaining a high flame retardancy comparable to the conventional halogen flame retardant materials.

Means for Solving the Problem

Generally, in a polyolefin resin composition filled with an inorganic material, a problem arises that peeling occurs at the interface between the inorganic material and the polyolefin resin causing blushing and this decreases the tensile strength, the elongation at break, and the abrasion resistance. Furthermore, in cases where a large amount of an inorganic material is included in order to increase the flame retardancy, the flexibility of the resin composition is deteriorated. However, the present inventors have found that the peeling between the inorganic materials and the resin composition can be controlled if specific polyolefin resins are used. Consequently, as a result of a series of intensive investigation on the findings thereof, the flame-retardant polyolefin resin composition mentioned below was invented.

That is, the flame-retardant polyolefin resin composition of the present invention is a flame-retardant polyolefin resin composition containing, with respect to 100 parts by weight of a polyolefin (A), 50 to 400 parts by weight of an inorganic flame retarding agent (B), wherein the polyolefin resin (A) comprises 30 to 94% by weight of a polypropylene resin (A-1), 1 to 30% by weight of a low-density polyethylene (A-2) in which the number of terminal vinyl groups per 1000 carbon atoms is 0.2 or more, and 5 to 40% by weight of a modified styrene thermoplastic elastomer (A-3) that possesses 0.4% by weight or more of a carboxylic acid group or an acid anhydride group.

With regard to the flame-retardant polyolefin resin composition of the present invention, it is preferable for the inorganic flame retarding agent (B) to be one containing an actual content of 98% by weight or more of magnesium hydroxide and/or aluminum hydroxide with an average particle size of 20 μm or less.

Furthermore, with regard to the flame-retardant polyolefin resin composition of the present invention, it is preferable for the polypropylene resin (A-1) to be produced by a multiple step polymerization method, and to contain a propylene-α-olefin copolymer containing 40 to 80% of a xylene-soluble component.

Effects of the Invention

The flame-retardant polyolefin resin composition of the present invention has excellent abrasion resistance, flexibility, low-temperature characteristics, tensile strength, and elongation at break, and heat resistance, irrespective of having a flame retardancy that is comparable with resin compositions including a large amount of halogen containing inorganic flame retardant materials. Consequently, such a flame-retardant polyolefin resin composition of the present invention is suitable for uses as electrical wires, wallpapers, flooring materials, and films for building materials, which particularly require flame retardancy, flexibility, and heat resistance.

BEST MODE FOR CARRYING OUT THE INVENTION

Figure 1:
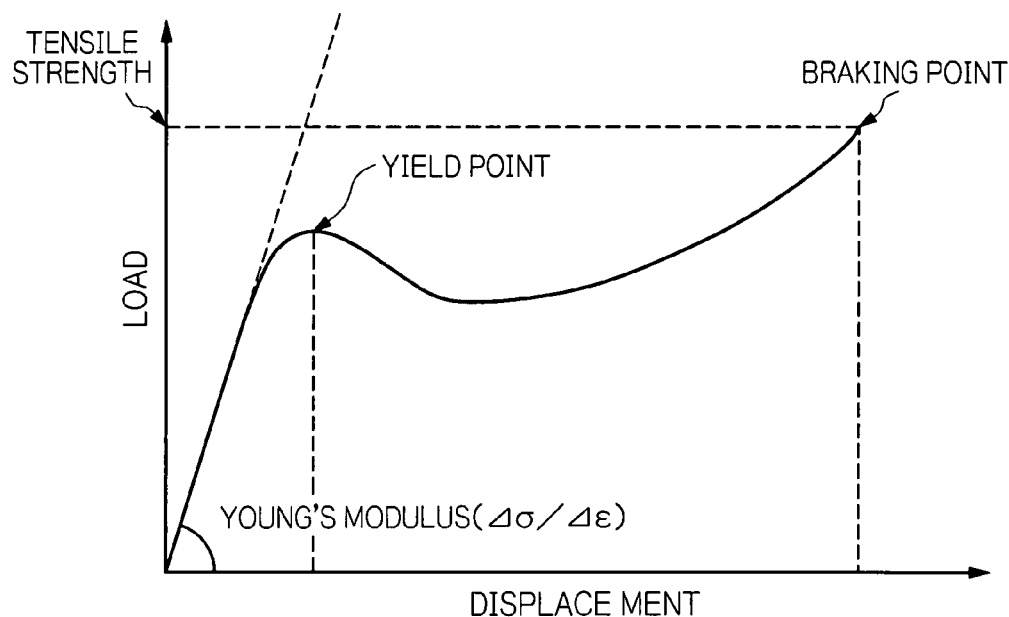
FIG. 1 is a diagram showing an example of a load-displacement curves measured in tensile test.

Hereunder, the present invention is explained in detail.

The flame-retardant polyolefin resin composition (hereunder abbreviated as resin composition) of the present invention comprises a polyolefin resin (A) and an inorganic flame retardant material (B), wherein the polyolefin resin (A) contains a polypropylene resin (A-1), a low-density polyethylene (A-2), and a modified styrene thermoplastic elastomer (A-3).
<Polyolefin Resin (A)>[Polypropylene Resin (A-1)]

The polypropylene resin (A-1) component contained in the polyolefin resin (A) is a resin component of a single component or two or more components selected from the group of a propylene homopolymer, a random copolymer of propylene and an α-olefin, or a block copolymer of propylene and an α-olefin. The α-olefin referred to here is an α-olefin other than propylene with a carbon number from 2 to 12, and examples include ethylene, butene-1, 4-methylpentene-1, hexane-1, and octane-1.

Furthermore, although there are no particular restrictions with respect to the polypropylene resin (A-1) as long as it is one mentioned above, it is preferable for the polypropylene resin (A-1) to be a propylene-α-olefin copolymer produced by the multiple step polymerization method as disclosed in, for example, Japanese Unexamined Patent Application, First Publication No. Hei 6-25367, that contains a xylene-soluble component. The multiple step polymerization method referred to here is a method that produces by a polymerization step of two or more stages, wherein, in the first stage, a propylene homopolymer or a crystalline random copolymer (crystalline propylene resin) of propylene including 5% by weight or less of an α-olefin other than propylene is produced, and, in the second stage thereafter, random copolymer elastomer of ethylene and one or more α-olefin components with a carbon number of 3 or more is produced. In this polymerization method, the resin components generated at each stage are blended within the polymerization reactor. As a result, compared to methods that mechanically blend the resin components, it is possible to finely disperse the ethylene-α-olefin random copolymer elastomer component within the crystalline propylene resin.

With regard to the polypropylene-α-olefin copolymer obtained as a result of such a multiple stage polymerization method, it is preferable for the average particle diameter of the ethylene-α-olefin random copolymer elastomer component to be 5 μm or less, and more preferably 1 μm or less. As a result of such a fine dispersion, it is possible to have a mutually penetrating network structure without possessing a clear island dispersion structure, and it is possible to further increase the dispersivity of the inorganic flame retardant resin, the low-temperature characteristics, and the abrasion resistance.

With regard to the crystalline polypropylene resin within the propylene-α-olefin produced by the multiple stage polymerization method mentioned above, a polypropylene homopolymer is preferable from the aspects of heat resistance and abrasion resistance.

For the elastomer component contained in the propylene-α-olefin copolymer, an ethylene-propylene random copolymer, or an ethylene-butene random copolymer is preferable. Furthermore, in regard to these copolymers, since the elastomer particle diameter can be made small, it is preferable for the ethylene content within the ethylene-propylene random copolymer, or the butane content within the ethylene-butene random copolymer to be approximately 15 to 50% by weight, and 20 to 40% by weight is more preferable. On the other hand, if the content thereof is less than 15% by weight or in excess of 50% by weight, the elastomer particle diameter becomes larger.

Furthermore, it is preferable for the xylene-soluble component within the propylene-α-olefin copolymer to be 40 to 80% by weight, and it is more preferable for it to be 50 to 65% by weight. If the xylene-soluble component falls below 40% by weight, there is a trend in the dispersivity of the inorganic flame retardant, the flexibility, and the low-temperature characteristics becoming insufficient in the obtained resin composition, and if it exceeds 80% by weight, the same trend has been observed that the mechanical strength of the resin composition decreases, so that a trend is generated that handling becomes difficult at the time of compounding as a result of a deterioration of powder characteristics of the resin composition. Here, the xylene-soluble component is the elastomer component.

The xylene-soluble component is measured as follows. Firstly, 2.5 g of the propylene-α-olefin copolymer is dissolved in 250 mL of xylene at 135° C., while stirring. After 20 minutes, the solution is cooled to 25° C. while stirring, and after further precipitation for 30 minutes, the precipitate is filtered, the filtrate is evaporated under a flow of nitrogen, and the residue is vacuum dried at 80° C. until a constant weight is reached. Then, the dried residue is weighed, and the percentage of the xylene-soluble component by weight at 25° C. is calculated.

Furthermore, with regard to the polypropylene resin (A-1) component, it is preferable to use the propylene-α-olefin copolymer produced by the multiple stage polymerization method mentioned above, in combination with an ordinarily commercial polypropylene homopolymer. If the propylene-α-olefin copolymer produced by the multiple stage polymerization method and a commercial propylene homopolymer are used together, the balance between the heat resistance and the flexibility is improved.

The content of the polypropylene resin (A-1) within the polyolefin resin (A) is 30 to 94% by weight. If the content of the polypropylene resin (A-1) is less than 30% by weight, the tensile strength and the heat resistance become low, and if it exceeds 94% by weight, the flexibility and the low-temperature characteristics become low.

[Low-Density Polyethylene (A-2)]

The low-density polyethylene (A-2) component is produced by the high-pressure radical polymerization method, and the density thereof is in a range of 0.91 g/cm$^3$ or more, and 0.94 g/cm$^3$ or less.

With regard to the low-density polyethylene (A-2), it is preferable that the MFR (Melt Flow Rate) is within 0.05 to 10.0 g/10 min, more preferable range is within 0.1 to 7.0 g/10 min, and the most preferable range is 0.2 to 5.0 g/10 min. At an MFR of 0.05 g/10 min or less, the forming ability sometimes becomes low, and if it exceeds 10.0 g/10 min, the abrasion resistance of the resin composition becomes insufficient.

Furthermore, the number of terminal vinyl groups of the low-density polyethylene (A-2) is 0.2 or more per 1000 carbon atoms, preferably 0.22 or more per 1000 carbon atoms, and more preferably 0.25 or more per 1000 carbon atoms. Since the presence of the terminal vinyl groups increases the polarity of the low-density polyethylene and, as a result of the presence of terminal vinyl groups of 0.2 or more per 1000 carbon atoms, the compatibility with the inorganic flame retardant with the resin and the reactivity of the interface between the resin and the agent are improved so that the abrasion resistance increases.

Here, the number of terminal vinyl groups is a value calculated from the measurements by an infrared absorption spectroscopic method. With regard to the infrared absorption spectroscopic method, although there are roughly two spectroscopic methods, consisting of a dispersive spectrophotometer and a Fourier transform spectrophotometer, it is preferable to perform measurements with the Fourier transform spectrophotometer, which has a higher wave number accuracy.

A practical method for measuring the number of terminal vinyl groups is described. The measurement sample utilizes a film of a thickness of 0.5±0.1 mm produced by the press molding method, and the measurement is conducted over a range of 5000 to 400 cm$^{-1}$, and an absorbance amount (ABS) is within a range of 0 to 2. Then, a baseline is drawn around 4650 to 3550 cm$^{-1}$ of the obtained spectrum chart, and the peak height A (cm) from the baseline at 4250 cm$^{-1}$ is calculated. Furthermore, a baseline is drawn around 950 to 860 cm$^{-1}$, and the peak height B (cm) from the baseline at 908 cm$^{-1}$ is calculated. Then, the number of terminal vinyl groups per 1000 carbon atoms is obtained by calculating the following formula.

(number of terminal vinyl groups per 1000 carbon atoms)=3.31×B/A

There are no particular restrictions on the method of producing the low-density polyethylene (A-2), and examples include a method using a tubular polymerization reactor, and a method in which a small amount of propylene is added as a chain transfer agent for molecular weight regulation at the time of polymerization.

The content of the low-density polyethylene (A-2) within the polyolefin resin (A) is 1 to 30% by weight. If the content of the low-density polyethylene (A-2) is less than 1% by weight, the abrasion resistance decreases, and if it exceeds 30% by weight, the elongation at break and the heat resistance decrease.

[Modified Styrene Thermoplastic Elastomer (A-3)]

The modified styrene thermoplastic elastomer (A-3) possesses a polystyrene phase at its terminals, and comprises a block copolymer of polybutadiene, polyisoprene, an ethylene-butylene copolymer, an ethylene-propylene copolymer, and a butylene-propylene copolymer in the intermediate phase, and further possesses a carboxylic acid group and/or an acid anhydride group.

Here, examples of the carboxylic acid group include α,β-unsaturated dicarboxylic acids such as maleic acid, fumaric acid, citraconic acid, and itaconic acid; and unsaturated monocarboxylic acids such as acrylic acid, methacrylic acid, furan acid, crotonic acid, vinyl acetic acid, and pentenoic acid. Furthermore, examples of the acid anhydride include anhydrides of the α-,β-unsaturated dicarboxylic acids such as maleic acid, fumaric acid, citraconic acid, and itaconic acid. These carboxylic acids or acid anhydrides may be used alone, or as a combination of two or more acids. Amongst the aforementioned, maleic acid and fumaric acid, or anhydrides thereof, are suitably used.

The quantity of the carboxylic acid group and/or the acid anhydride group within the modified styrene thermoplastic elastomer (A-3) is 0.4% by weight or more, and in order to further increase the abrasion resistance, it is preferable that the quantity thereof is 0.7% by weight or more. If the quantity of the carboxylic acid or the acid anhydride group is less than 0.4% by weight, mechanical strength, such as the abrasion resistance, the tensile strength, and the elongation, becomes insufficient when the inorganic flame retarding agent is filled.

Amongst the modified styrene thermoplastic elastomers (A-3), a styrene-ethylenebutylene-styrene block copolymer (SEBS) to which maleic anhydride is added by graft modification is most preferable. The styrene proportion in this maleic anhydride-modified SEBS is preferably 20 to 40% by weight, and more preferably 25 to 35% by weight. If the styrene proportion is less than 20% by weight, there is a tendency for the abrasion resistance to become low, and if it exceeds 40% by weight, the dispersibility of the styrene thermoplastic elastomer decreases, and the mechanical characteristics are tend not to become sufficiently high.

The modified styrene thermoplastic elastomer, which comprises a carboxylic acid group and/or an acid anhydride group, is obtained by reacting a carboxylic acid group and/or an acid anhydride group with the styrene thermoplastic elastomer. Examples of the method thereof include a method comprising the steps of mixing of the styerene thermoplastic elastomer with a carboxylic acid and/or an acid anhydride and an initiating reagent, such as an organic peroxide, and melting for kneading the mixture; and a method comprising the steps of mixing of a carboxylic acid and/or an acid anhydride, and an organic peroxide with the styrene thermoplastic elastomer in an organic solvent such as benzene, toluene, and xylene, and melting and kneading the mixture. The organic peroxide referred to here is a radical generator, for example, benzoyl peroxide, dicumyl peroxide, and t-butyl peroxide.

The content of the modified styrene thermoplastic elastomer (A-3) within the polyolefin resin (A) is 5 to 40% by weight, preferably 6 to 30% by weight, and more preferably 8 to 20% by weight. As a result of incorporation in such a range, both the mechanical strength, such as the abrasion resistance, the flexibility, the tensile strength, and the elongation, and the flowability are achieved. On the other hand, if the content of the modified styrene thermoplastic elastomer (A-3) is less than 5% by weight, the mechanical strength, such as the abrasion resistance, the tensile strength, and the elongation at break, becomes insufficient, and if it exceeds 40% by weight, the flowability greatly decreases, and the forming ability becomes low.

<Inorganic Flame Retarding Agent (B)>

Examples of the inorganic flame retarding agent (B) include oxides, hydroxides and carbonates of various metals, such as magnesium, aluminum, calcium, potassium, zinc, and silicon, as a single compound, or a mixture of two or more compounds selected from above compounds. Among these compounds, because of the high flame-retarding effect and excellent economic efficiency, magnesium hydroxide and/or aluminum hydroxide are preferable when an average particle diameter is 20 μm or less. Furthermore, it is preferable that the average particle diameter is 10 μm or less, and more preferably, 5 μm or less.

Furthermore, with regard to the inorganic flame retarding agent (B), a surface treatment may be performed by a surface treatment agent such as a fatty acid, for example, stearic acid, oleic acid, and palmitic acid, or the metal salts thereof, wax, an organic titanate, and an organosilane, with an object of preventing aggregation or improving the dispersibility. In that case, if the quantity of the surface treatment agent is too large, the flame retardancy of the resin composition becomes low, and furthermore, since the coupling effect of the modified styrene thermoplastic elastomer (A-3) component decreases, in some cases, the tensile characteristics and the abrasion resistance of the resin composition decrease. As a result, the actual content of the inorganic flame retardant is preferably 98% by weight or more, and more preferably 99% by weight or more.

A measurement example of the actual content of the inorganic flame retardant is described below. This example shows an example of measuring the content of magnesium hydroxide.

First, 300 mg of magnesium hydroxide is accurately weighed, moistened with approximately 1 mL of ethanol, 12 mL of 1 mol/L hydrochloric acid is added, heat dissolution is performed, and following cooling, water is added such that the solution is accurately made up to 200 mL. 10 mL of this liquid is accurately measured, approximately 80 mL of water is added, and is neutralized with a 0.02 mol/L sodium hydroxide solution. 2 mL of an ammonia/ammonium chloride buffer solution with a pH of 10.7 is added, and titration is performed in an automatic titration apparatus using a 0.01 mol/L ethylenediaminetetraacetic acid dihydride disodium solution (EDTA). Then, the actual content is calculated from this titration volume.

The content of the inorganic flame retarding agent (B) is, with respect to 100 parts by weight of the polyolefin resin (A), 50 to 400 parts by weight, preferably 55 to 300 parts by weight, and more preferably 55 to 200 parts by weight, and the added quantity is appropriately selected within this range according to the flame retardance of the final application. On the other hand, if the inorganic flame retarding agent (B) is less than 50 parts by weight, the flame retardancy is insufficient, and if it exceeds 400 parts by weight, it becomes too rigid, and becomes impractical.

With regard to the resin composition of the present invention, an appropriate quantity of various auxiliary components can be included as required, for example, various antioxidants such as a phenol, a phosphorus, and a sulfur, coloring agents, nucleating agents, antistatic agents, metallic fatty acid salts, lubricating agents, such as an amide, silicone, and polytetrafluoroethylene, slipping agents, processing aids, metallic deactivating agents, and an anti-ultraviolet agents.

(Production Method)

The aforementioned resin composition can be produced by continuously supplying a predetermined quantity of the components from a constant quantity feeder, or by melt kneading using a commonly-known kneader, such as a single screw extruder, a twin screw extruder, a Banbury mixer, a kneader, or a roller mill, following preblending of the components beforehand using a high-speed mixing apparatus, such as a Henschel mixer, or a tumbler.

In the resin composition explained above, with respect to 100 parts by weight of the polyolefin resin (A), which comprises a specified quantity of the polypropylene resin (A-1), the low-density polyethylene (A-2), and the modified styrene thermoplastic elastomer (A-3), it contains 50 to 400 parts by weight of the inorganic flame retarding agent (B). The resin composition, which contains a large amount of the inorganic flame retardant in this manner, has a flame retardance that is equivalent to halogen flame retardant resins. Furthermore, in this resin composition, detachment at the interface between the polyolefin resin and the inorganic flame retardant is prevented, and it has excellent abrasion resistance, flexibility, low-temperature characteristics, tensile strength, elongation at break, and heat resistance.

EXAMPLES

Hereunder, examples are shown, and the present invention is more practically described. However, the present invention is in no way restricted by these examples. In regard to the following examples, the MFR are values calculated on a JIS K 7210, wherein the polypropylene resin (A-1) and the modified styrene thermoplastic elastomer (A-3) are measured at 230° C. with a load of 2.16 kg, and the low-density polyethylene (A-2) is measured at 190° C. with a load of 2.16 kg.

The details of a polyolefin resin (A) utilized in the examples and the Comparative Examples are described.

The polyolefin resin (A) is one comprising the polypropylene resin (A-1), the low-density polyethylene (A-2), and the modified styrene thermoplastic elastomer (A-3).

<Polypropylene Resin (A-1)>(A-1-1) Multiple Step Polymerization Polypropylene (PP) Copolymer

[Production Method]

As disclosed in Japanese Unexamined Patent Application, First Publication No. Sho 57-61012, a solid catalyst component was used, which carries a reaction product between titanium tetrachloride and ethylbenzoic acid on a solid component obtained by co-grinding of magnesium chloride and tetraethoxysilane. Next, a 1.5 L stainless-made autoclave was charged with 15.6 mg of the solid catalyst component, triethylaluminum as organic aluminum, and ethylbenzoic acid as an electron donating compound in respective quantities of 300 molppm and 75 molppm with respect to 300 g of propylene, and 0.3 molppm of hydrogen was further added. Next, the temperature of the autoclave was rapidly increased to 70° C., and after maintaining 70° C. for 10 minutes, the autoclave was rapidly cooled to 30° C., 16 mol % of ethylene was further added, and polymerization was continued for 50 minutes. Next, the gas within the autoclave was discharged, polymerization was stopped, and after vacuum drying, a powder form multiple stage polymerized polypropylene copolymer was obtained. The analysis results of the obtained multiple stage polymerized polypropylene copolymer is shown in Table 1.

TABLE 1

| MFR | 0.8 g/10 min |
| --- | --- |
| Xylene-soluble component | 60 weight % |
| Xylene-insoluble component | 40 weight % |
| Propylene fraction within xylene-soluble component | 72 weight % |

(A-1-2) PP-1: SunAllomer Co. manufactured homopolypropylene (HOMO), PS201A (MFR; 0.5 g/10 min, xylene-soluble component; 1.5% by weight) (A-1-3) PP-2: SunAllomer Co. manufactured block polypropylene (HECO), PB170A (MFR; 0.3 g/10 min, xylene-soluble component; 17% by weight) (a-1-4) EPR: Mitsui Chemical Co. manufactured Tafmer, P-0280 (MFR; 2.9 g/10 min, xylene-soluble component; 99% by weight)

[Measurement Method of Xylene-Soluble Component]

First, 2.5 g of the resin was dissolved in 250 mL of xylene at 135° C. while stirring. After 20 minutes, the solution was cooled to 25° C. while stirring, and after precipitation for 30 minutes, the precipitate was filtered, the filtrate was evaporated under a flow of nitrogen, and the residue was vacuum dried at 80° C. until a constant weight was reached. Then, the dried residue was weighed, and the % by weight of the xylene-soluble component at 25° C. was calculated.

<Low-Density Polyethylene (A-2)>(A-2-1) LDPE-1: Mitsui Chemical Co. manufactured Mirason 3530 (MFR; 0.23 g/10 min, density; 0.924 g/cm$^3$, terminal vinyl groups; 0.29 groups/1000 carbon atoms) (A-2-2) LDPE-2: Japan Polyolefin Co. manufactured JK121A (MFR; 0.25 g/10 min, density 0.922 g/cm$^3$, terminal vinyl groups; 0.16 groups/1000 carbon atoms) [Number of Terminal Vinyl Groups]

The number of terminal vinyl groups per 1000 carbon atoms was measured using the aforementioned measurement method by utilizing a JASCO Co. manufactured Fourier transform infrared spectrometer VALOR-3.

<Modified Styrene Thermoplastic Elastomer (A-3)>[Production Method]

After preblending of a predetermined amounts of maleic anhydride and an organic peroxide into SEBS comprising a styrene proportion of 28% by weight, it was produced by melt kneading with a single screw extruder.

(A-3-1) Acid modified SEBS-1: maleic anhydride content; 1.0% by weight, styrene proportion; 28% by weight (A-3-2) Acid modified SEBS-2: maleic anhydride content; 0.3% by weight, styrene proportion; 28% by weight Furthermore, as a Comparative Example, a styrene thermoplastic elastomer that does not contain carboxylic acid groups or acid anhydride groups, and a polypropylene thermoplastic elastomer containing 1.0% by weight of maleic anhydride, were prepared.

(A-3-3) SEBS: unmodified, styrene proportion; 29% by weight (A-3-4) Acid modified PP: maleic anhydride content; 1.0% by weight, MFR; 80 g/10 min <Inorganic Flame retarding agent (B)>(B-1) Magnesium hydroxide (Mg(OH)$_2$)-1: Kyowa Chemical Industries Co. manufactured Kisuma 5A low surface treated product (Mg(OH)$_2$ quantity; 99.3% by weight) (B-2) Magnesium hydroxide-2: Kyowa Chemical Industries Co. manufactured Kisuma 5P silane coupling agent surface treated product (Mg(OH)$_2$ quantity; 99.5% by weight) (B-3) Magnesium hydroxide-3: Kyowa Chemical Industries Co. manufactured Kisuma 5A normal product (Mg(OH)$_2$ quantity; 97.5% by weight)

The average particle diameters of each of (B-1) to (B-3) are 0.8 μm.

<Production Method of Resin Composition>

The aforementioned components were combined as shown in Table 2 (Examples), or Table 3 and Table 4 (Comparative Examples) and the combined components were mixed in a Henschel mixer with a capacity of 20 liters. The mixed components were melt and kneaded by utilizing a (φ40 mm same direction twin screw extruder in which the die temperature had been set to 200° C. Thereafter, a sheet with a thickness of 0.2 mm was prepared using a φ30 mm extruder, equipped with a 100 mm wide T-die on the top, at a molding temperature of 230° C. and at a pulling speed of 2.0 m/min. Furthermore, as a result of a separate pressurizing press, a sheet with a thickness of 3.0 mm was prepared, and was made the sample for oxygen index measurement.

TABLE 2

|  |  |  |  | Example | | | | |
|---|---|---|---|---|---|---|---|---|
|  |  |  |  | 1 | 2 | 3 | 4 | 5 |
| (A-1) | Multiple stage polymerized PP copolymer | | weight % | 80 | 60 | 40 | 60 | 80 |
|  | PP-1 | | |  | 20 |  | 20 |  |
|  | PP-2 | | |  |  | 40 |  |  |
|  | EPR | | |  |  |  |  |  |
| (A-2) | LDPE-1 | | | 10 | 10 | 10 | 10 | 10 |
|  | LDPE-2 | | |  |  |  |  |  |
| (A-3) | Acid modified SEBS-1 | | | 10 | 10 | 10 | 10 | 10 |
|  | Acid modified SEBS-2 | | |  |  |  |  |  |
|  | SEBS | | |  |  |  |  |  |
|  | Acid modified PP | | |  |  |  |  |  |
| (B) | Magnesium hydroxide-1 | | parts by | 70 | 70 | 70 |  | 250 |
|  | Magnesium hydroxide-2 | | weight |  |  |  | 70 |  |
|  | Magnesium hydroxide-3 | | |  |  |  |  |  |
| Evaluation | Tensile strength | | MPa | 25 | 30 | 31 | 32 | 21.5 |
| result | Tensile elongation at break | | % | 730 | 620 | 580 | 570 | 320 |
|  | Young's modulus | | MPa | 480 | 600 | 620 | 610 | 1300 |
|  | Abrasion resistance | | freq. | 105 | 145 | 150 | 155 | 85 |
|  | LOI | | % | 24.5 | 25.0 | 25.0 | 25.5 | 31.5 |

TABLE 3

|  |  |  |  | Comparative Example | | | | | |
|---|---|---|---|---|---|---|---|---|---|
|  |  |  |  | 1 | 2 | 3 | 4 | 5 | 6 |
| (A-1) | Multiple stage polymerized PP copolymer | | wt. % | 66 | 25 | 60 | 60 | 60 | 80 |
|  | PP-1 | | | 20 | 20 | 20 | 20 | 20 |  |
|  | PP-2 | | |  |  |  |  |  |  |
|  | EPR | | |  |  |  |  |  |  |

TABLE 3-continued

|  |  |  | Comparative Example | | | | | |
|---|---|---|---|---|---|---|---|---|
|  |  |  | 1 | 2 | 3 | 4 | 5 | 6 |
| (A-2) | LDPE-1 |  | 10 | 10 | 10 | 10 | 10 | 10 |
|  | LDPE-2 |  |  |  |  |  |  |  |
| (A-3) | Acid modified SEBS-1 |  | 4 | 45 |  |  |  |  |
|  | Acid modified SEBS-2 |  |  |  | 10 |  |  |  |
|  | SEBS |  |  |  |  | 10 |  |  |
|  | Acid modified PP |  |  |  |  |  | 10 | 10 |
| (B) | Magnesium hydroxide-1 | parts | 70 | 70 | 70 | 70 | 70 | 250 |
|  | Magnesium hydroxide-2 | by |  |  |  |  |  |  |
|  | Magnesium hydroxide-3 | wt. |  |  |  |  |  |  |
| Evaluation | Tensile strength | MPa | 33 | Flowability | 32 | 25 | 41 | 19 |
| result | Tensile elongation at break | % | 600 | low and | 650 | 430 | 380 | 220 |
|  | Young's modulus | MPa | 550 | could not be | 580 | 700 | 930 | 2350 |
|  | Abrasion resistance | freq. | 95 | molded | 100 | 65 | 220 | 140 |
|  | LOI | % | 24.5 |  | 24.5 | 24.0 | 25.5 | 32.0 |

TABLE 4

|  |  |  | Comparative Example | | | | | |
|---|---|---|---|---|---|---|---|---|
|  |  |  | 7 | 8 | 9 | 10 | 11 | 12 |
| (A-1) | Multiple stage polymerized PP copolymer | weight % | 70 | 70 | 60 | 30 | 60 |  |
|  | PP-1 |  | 20 | 20 | 20 | 20 | 20 |  |
|  | PP-2 |  |  |  |  |  |  | 50 |
|  | EPR |  |  |  |  |  |  | 30 |
| (A-2) | LDPE-1 |  |  |  |  | 40 | 10 | 10 |
|  | LDPE-2 |  |  |  | 10 |  |  |  |
| (A-3) | Acid modified SEBS-1 |  | 10 | 10 | 10 | 10 | 10 | 10 |
|  | Acid modified SEBS-2 |  |  |  |  |  |  |  |
|  | SEBS |  |  |  |  |  |  |  |
|  | Acid modified PP |  |  |  |  |  |  |  |
| (B) | Magnesium hydroxide-1 | parts by | 70 |  | 70 | 70 |  | 70 |
|  | Magnesium hydroxide-2 | weight |  | 70 |  |  |  |  |
|  | Magnesium hydroxide-3 |  |  |  |  |  | 70 |  |
| Evaluation | Tensile strength | MPa | 29 | 30 | 28 | 32 | 27 | 30 |
| result | Tensile elongation at break | % | 620 | 600 | 650 | 250 | 580 | 550 |
|  | Young's modulus | MPa | 580 | 570 | 600 | 820 | 650 | 670 |
|  | Abrasion resistance | freq. | 97 | 97 | 95 | 88 | 90 | 125 |
|  | LOI | % | 24.5 | 24.5 | 24.5 | 24.0 | 24.0 | 24.5 |

<Testing Method>

Tensile testing, and various physical testing of the abrasion resistance and the LOI were performed on the obtained sheet. The measurement method of the characteristics are shown below.

[Tensile Testing]

From the 0.2 mm thick sheet, a JIS K 6251 No. 3 dumbbell was punched through along the sheet flow direction, and test specimens were prepared. Then, at room temperature, tensile testing was performed with tensile speed; 200 mm/min, distance between chucks; 60 mm, distance between marked lines $L_0$; 20 mm, and the strength at the time of break of the test specimen divided by the minimum cross-sectional area was made the tensile strength. Furthermore, the distance between marked lines at the time of break was denoted by L, and the elongation at break was calculated from the formula $(L-L_0)/L_0 \times 100$.

Furthermore, a tangent was drawn at the initial starting portion of the load-displacement curves (refer to FIG. 1) in the tensile test, and the Young's modulus E was calculated by $\Delta\sigma/\Delta\epsilon$ ($\Delta\sigma$: the difference in stress (load/average cross-sectional area) between two arbitrary points on the tangent, $\Delta\epsilon$: the difference in distortion between the same two points). It is exhibited that the lower the Young's modulus, the higher is the flexibility.

[Abrasion Resistance]

Figure 2:
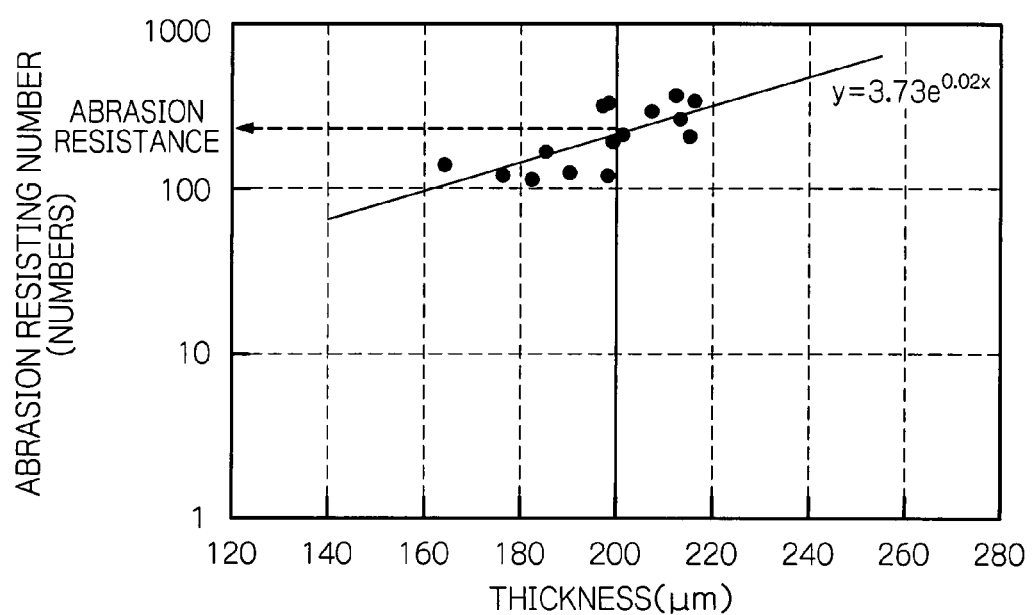
FIG. 2 is a diagram showing an example of a semi-logarithmic graph in which the abrasion resisting numbers are plotted against the sheet thickness in the abrasion resistance test.

Abrasion testing was performed on the blade reciprocation method exhibited in JASO D611-12-(2), utilizing a load of 3 N, and a $\phi$0.45 mm piano wire as the blade. Specifically, a 0.2 mm thick sheet was used as the test specimen, and this was wrapped on a fixed $\phi$1.4 mm metallic rod, and was firmly fixed. Next, following contact of the blade with the test specimen, it was made to reciprocate, and the test specimen was abraded. Then, the number of reciprocations was measured as the abrasion resistant number until the blade made contact with the metallic rod was measured for 20 points or more per sample, the sheet thicknesses and the abrasion resistant numbers representing the abrasion resistance were plotted on a semilogarithmic graph (refer to FIG. 2), and as a result of the least-square method, the abrasion resistance at a thickness of 0.2 mm was calculated, and the value thereof was made the abrasion resistance.

[LOI (Limiting Oxygen Index)]

Pellets of the resin composition were prepared by press molding (preheating 3 min, pressurizing 1 min) at 230° C., a 3 mm thick sheet was prepared, and a No. A-1 sample specified in JIS K 7201 was cut out and measured conforming to JIS K 7201. The higher this LOI, the higher the flame retardancy.

As shown in Table 2, Examples 1 to 5, which satisfy the scope of claim 1 of the present application, were excellent in each amongst abrasion resistance, tensile strength, elongation at break, flexibility, and flame retardance, and furthermore, they had excellent low-temperature characteristics and heat resistance.

On the other hand, as shown in Table 3 or Table 4, Comparative Examples 1 to 12 were low in any one of abrasion resistance, tensile strength, elongation at break, flexibility, flame retardance, or flowability. Hereunder, they are explained in detail compared to the Examples.

In Comparative Example 1, wherein the quantity of the acid modified SEBS-1 (A-3-1) was decreased from Example 2 and the quantity of the multiple stage polymerized PP copolymer (A-1-1) was increased by that amount, the abrasion resistance was low compared to Example 2. Furthermore, in Comparative Example 2, wherein the quantity of the acid modified SEBS-2 (A-3-2) was increased, and the multiple stage polymerized PP copolymer (A-1-1) was decreased by that amount, the viscosity considerably increased, the flowability became low, and it could not be molded.

In Comparative Example 3, wherein the acid modified SEBS-1 (A-3-1) was substituted by acid modified SEBS-2 (A-3-2) that has a low modification quantity, or in Comparative Example 4, wherein it is substituted by SEBS (A-3-3) that is not acid modified, the abrasion resistance was low compared to Example 2.

In Comparative Example 5, wherein the acid modified SEBS (A-3-1) in Example 2 is substituted by acid modified PP (A-3-3), although the abrasion resistance is excellent compared to Example 2, the Young's modulus was very high, and the flexibility was low.

In Comparative Example 6, wherein the acid modified SEBS-1 (A-3-1) in Example 5, which placed a higher priority on flame retardance and the filled quantity of magnesium hydroxide (B-1) was increased, was substituted by acid modified PP (A-3-3), compared to Example 5, the Young's modulus was very high, and the flexibility was low.

In Comparative Example 7 or Comparative Example 8, wherein the LDPE-1 (A-2-1) in Example 2 or in Example 4 was eliminated and the quantity of the multiple stage polymerized PP copolymer (A-1-1) was increased by that amount, compared to Example 2 or Example 4, the abrasion resistance was low. Accordingly, it can be understood that by including LDPE-1 (A-2-1), the abrasion resistance increases.

In Comparative Example 9, wherein the LDPE-1 (A-2-1) in Example 2 was substituted by LDPE-2 (A-2-2) that has a low quantity of terminal vinyl groups, the abrasion resistance was low. Accordingly, it can be understood that if the quantity of terminal vinyl groups in the LDPE is too low, the abrasion resistance cannot be sufficiently improved.

In Comparative Example 10, wherein the LDPE-1 (A-2-1) in Example 2 was increased to 40% by weight, the abrasion resistance was low and the elongation at break was very low.

In Comparative Example 11, wherein the magnesium hydroxide-1 (B-1) in Example 2 or the magnesium hydroxide-2 magnesium hydroxide-2 (B-2) in Example 4 is substituted by magnesium hydroxide-3 (B-3) that was treated by an increased amount of surface treating agent, although the elongation at break was excellent, compared to Example 2 and Example 4, the abrasion resistance was low.

In Comparative Example 12, wherein the multiple stage polymerized PP copolymer (A-1-1) and the homo PP (A-1-2) in Example 2 was substituted (the total rubber component quantity is the same) by block PP (A-1-3) and EPR (A-1-4), compared to Example 2, the abrasion resistance and the elongation at break was low. Accordingly, it can be understood that the multiple stage polymerized PP copolymer contributes to the improvement of the abrasion resistance and the elongation at break.

INDUSTRIAL APPLICABILITY

The flame-retardant polyolefin resin obtained according to the present invention, which has excellent mechanical characteristics, such as flame retardancy, abrasion resistance, flexibility, low-temperature characteristics, tensile strength, and elongation at break, and heat resistance, can be applied to a wide range of fields, such as various industrial materials, auto parts, consumer electronic appliances, and packaging materials.

The invention claimed is:

1. A flame-retardant polyolefin resin composition comprising 100 parts by weight of a polyolefin resin (A) and 50 to 400 parts by weight of an inorganic flame retarding agent (B),
wherein the polyolefin resin (A) comprises 30 to 94% by weight of a crystalline polypropylene resin (A-1) comprising a copolymer of propylene and α-olefins (A-1-1), propylene homopolymer (A-1-2) and a block polypropylene copolymer (A-1-3), 1 to 30% by weight of a low-density polyethylene (A-2) in which the number of terminal vinyl groups per 1000 carbon atoms is 0.2 or more, and 5 to 10% by weight of a modified styrene thermoplastic elastomer (A-3) that possesses 0.4% by weight or more of a carboxylic acid group and/or an acid anhydride group;
wherein the copolymer of propylene and α-olefins (A-1-1) is a multiple step polymerization polypropylene copolymer, which includes an ethylene-α-olefin random copolymer elastomer component having an average particle diameter of 1 μm or less finely dispersed within the crystalline polypropylene resin, forming a mutually penetrating network structure;
wherein the flame-retardant polyolefin resin composition possess a tensile strength of more than 30 MPa and a tensile elongation at break in a range from 570% to 620%.

2. A flame-retardant polyolefin resin composition according to claim 1, wherein the inorganic flame retarding agent (B) comprises a content of 98% by weight or more of magnesium hydroxide and/or aluminum hydroxide, and wherein an average particle size of the inorganic flame retarding agent is 20 μm or less.

3. A flame-retardant polyolefin resin composition according to any one of claim 1 and claim 2, wherein the polypropylene resin (A-1) comprises a propylene-α-olefin copolymer, which is manufactured by a multiple step polymerization method, and comprises a propylene-α-olefin copolymer containing 40 to 80% of a xylene-soluble component, wherein the α-olefin is selected from the group consisting of α-olefins, excluding propylene, with a carbon number from 2 to 12.

4. A flame-retardant polyolefin resin composition according to claim 1, wherein the α-olefin in the copolymer of propylene and α-olefins is selected from the group consisting of ethylene, 1-butene, 4-methyl-1-pentene, 1-hexene, and 1-octene.

* * * * *